Patented Aug. 1, 1950

2,517,350

UNITED STATES PATENT OFFICE 2,517,350

THERMOPLASTIC COMPOSITIONS PLASTICIZED WITH AN ESTER OF 3,5,5-TRIMETHYL-1-HEXANOL

Hugh G. Reid, Norton-on-Tees, England, assignor to Imperial Chemical Industries Limited, a corporation of Great Britain No Drawing. Application August 26, 1948, Serial No. 46,361. In Great Britain September 8, 1947

7 Claims. (Cl. 260—31.2)

This invention relates to new compositions, and more particularly to compositions containing organic thermoplastic materials and shaped articles manufactured from such compositions. The invention is concerned with compositions containing one or more organic thermoplastic materials and one or more plasticisers therefor.

A wide variety of plasticisers have previously been proposed for incorporation into compositions comprising organic thermoplastic materials. Thus, for example, numerous esters, such as certain phthalates, phosphates, glycollates and citrates have been used as plasticisers for different organic thermoplastic materials including cellulose derivatives, for example, cellulose acetate, cellulose acetobutyrate, cellulose nitrate or nitrocellulose, and ethyl cellulose, polymers and interpolymers of various unsaturated compounds, for example, vinyl chloride and vinyl acetate, and derivatives of such polymers and interpolymers, for example, partially or completely hydrolysed polymers and interpolymers of vinyl acetate and the corresponding acetal derivatives, and halogenated solid polymers of ethylene. The choice of plasticiser to be used depends on a variety of factors, such as the particular thermoplastic material to be plasticised, and the use to which the resultant composition is to be put. The plasticiser must be sufficiently compatible with the thermoplastic material and must be undissolved and stable in the presence of any substances with which the composition is likely to come into contact. Furthermore, the plasticiser must be retained in the composition under a wide variety of conditions.

The nature and the proportion of plasticiser used in a given composition will affect the physical properties of the composition, for example, the flexibility, electrical resistivity, softening-point, and toughness, and to some extent the chemical properties such as stability and inflammability. In addition to plasticisers, plasticiser extenders such as chlorinated paraffin waxes as described in British patent specification Nos. 573,840; 573,841 and 579,550 may be incorporated, for example, to increase the compatibility of a true plasticiser for the thermoplastic material or to reduce the flexibility of the composition. Whilst for most purposes it is usually possible to select a suitable plasticiser from those already known, for some applications known plasticisers are not completely satisfactory, and it is usually necessary to compromise between a number of different plasticisers for a particular purpose, consideration being given to physical properties, availability and cost.

An object of this invention is to provide new compositions of matter comprising thermoplastic materials and plasticisers therefor. Another object of the invention is to provide such compositions from which may be produced articles of improved mechanical properties, for example, by calendering. Other objects will appear hereinafter.

These objects are accomplished according to the present invention by providing a composition comprising one or more organic thermoplastic materials and one or more esters, each ester being derived from a nonyl alcohol and a monobasic organic acid.

The organic thermoplastic material or materials may consist of one or more natural or synthetic resins, including, for example, cellulose derivatives such as cellulose nitrate or nitrocellulose, cellulose acetate, cellulose acetobutyrate, cellulose acetopropionate, ethyl cellulose and benzyl cellulose, polymers and interpolymers of compounds containing the vinylidene group (that is, the group $CH_2=C<$), such as vinyl chloride, vinyl acetate, vinylidene chloride, and acrylic acid derivatives, for example, methyl methacrylate and acrolonitrile, certain derivatives of some of these polymers and interpolymers, such as acetals of hydrolysed polyvinyl ester derivatives, especially butyrals, halogenated solid polymers of ethylene, and synthetic rubbers such as Neoprene and butadiene copolymers with styrene or acrylonitrile. The plasticisers of this invention are of particular value when the organic thermoplastic material used in the compositions of the present invention is a copolymer of vinyl chloride. It has been found that compositions of the invention containing polymers or interpolymers of vinyl chloride and vinylidene chloride are of improved heat-stability to previously known compositions of such polymers and interpolymers with plasticisers.

Suitable combinations of organic thermoplastic material and nonyl ester in accordance with the invention include, for example, polymers and copolymers of vinyl chloride with nonyl methacrylate, benzoate or p-chlorbenzoate; polyvinyl acetal with nonyl methacrylate or stearate; polyvinyl butyral with nonyl methacrylate; chlorinate polythene, such as that known as "Halothene" grade 52/68/2, with nonyl methacrylate, stearate, formate or acetate; ethyl cellulose with nonyl methacrylate, formate or acetate; and nitrocellulose, with nonyl formate, acetate, stearate or methacrylate. Some of the nonyl esters of the present invention are solvents for some organic thermoplastic materials and may be used to produce solutions thereof. Thus nonyl formate and acetate are both solvents for ethyl cellulose, nitrocellulose, chlorinated polythene and vinyl chloride/vinyl acetate copolymers.

It is preferred that the nonyl alcohol from which the ester plasticiser is derived should consist primarily of 3,5,5-trimethyl-1-hexanol,

but other isomeric nonyl alcohols may be present. Thus in the synthesis of 3,5,5-trimethyl-1-hexanol minor amounts of the other isomeric nonyl alcohols are almost invariably formed. It has been found, however, that the alcohol may be esterified to produce the nonyl ester plasticiser without removing the isomeric alcohols and without any substantial loss in properties. However, the other isomeric nonyl alcohols are also suitable for the practice of this invention.

Mono-basic organic acids suitable for forming the ester plasticisers of the invention include, for example, formic, stearic, methacrylic, oleic, ricinoleic, lauric, levulinic, acetic, propionic, butyric, hexoic, abietic and benzoic and chlorbenzoic acids.

The preferred esters for use in the practice of this invention are the benzoate and chlorbenzoate of 3,5,5-trimethyl-1-hexanol.

The compositions of this invention may be in the form of solid moulding materials, pastes, lacquers, solutions or dispersions according to the proportions of the essential ingredients and other ingredients of the compositions. The relative amounts of the thermoplastic materials and the nonyl esters used in forming the compositions of the invention may be varied within wide limits according to the particular properties required. In general the amounts are similar to those used conventionally with other plasticisers, a proportion of plasticiser in the compositions of from about 10 to 60% by weight, for example, being suitable for most purposes.

In addition to the organic thermoplastic materials and the nonyl ester plasticisers other ingredients may be present in the compositions of the invention if desired, for example, other plasticisers, plasticiser extenders such as chlorinated paraffin waxes, stabilisers, fillers and colouring materials. Thus with vinyl chloride polymers and interpolymers it is often desirable to include a substance which acts as a heat-stabiliser, and any heat-stabilisers for vinyl chloride polymers and interpolymers may be used in the compositions of the invention.

The compositions of the invention are suitable for all applications of previously known thermoplastic resin/plasticiser compositions, including, for example, moulding, extrusion, cable covering, coating applications such as in the manufacture of leathercloth, and the production of hollow articles such as by the methods described in British patent specifications Nos. 521,093; 591,611 and 600,270. Other applications and methods of fabrication for which these compositions are suitable are described in British patent specification No. 500,298. The compositions of the invention are particularly suitable for fabrication by calendering, the calendered products having improved mechanical properties when compared with compositions previously used for the production of articles by calendering thermoplastic compositions. Furthermore, the compositions of the invention have higher volume resistivity than compositions of similar flexibility containing previously known plasticisers. Another advantage of the compositions of the invention is that they have little tendency to lose plasticiser even over long periods of time, so that they do not deteriorate or age.

By employing mixtures of different nonyl esters of monobasic organic acids it is often possible to secure properties in the compositions which would be unobtainable otherwise.

The invention is illustrated but in no way limited by the following examples, in which all parts are by weight.

Example 1

The following composition is a typical example of a composition suitable for extrusion, for example, as belting.

|  | Parts |
| --- | --- |
| Polyvinyl chloride | 100 |
| Nonyl p-chlorbenzoate | 60 |
| Ethyl palmitate | 1 |
| White lead | 8 |
| Titanium oxide | 3 |

The composition has a B. S. hardness at 20° C. of 46.

Example 2

A solution was prepared according to the following formula:

|  | Parts |
| --- | --- |
| Nitrocellulose Grade HX 30–50 | 10 |
| Nonyl formate | 10 |
| Butyl acetate | 27 |
| Toluene | 52 |
| Butyl alcohol | 8 |

Clear films were obtained from this solution by the solvent-casting technique.

Similar results were obtained by replacing the nonyl formate by nonyl acetate, methacrylate or stearate.

I claim:

1. A composition of matter comprising a solid polymer of a substance selected from the group consisting of vinyl chloride, vinyl acetate and vinylidene chloride in combination with an ester of 3,5,5-trimethyl-1-hexanol and a monobasic organic acid selected from the group consisting of formic, stearic, methacrylic, oleic, ricinoleic, lauric, levulinic, acetic, propionic, butyric, hexoic, abietic, chlorbenzoic and benzoic.

2. A composition of matter comprising a reaction product which is an interpolymer of a substance selected from the group consisting of vinyl chloride, vinyl acetate and vinylidene chloride with acrylonitrile in combination with an ester of 3,5,5-trimethyl-1-hexanol and a monobasic organic acid selected from the group consisting of formic, stearic, methacrylic, oleic, ricinoleic, lauric, levulinic, acetic, propionic, butyric, hexoic, abietic, chlorbenzoic and benzoic.

3. A composition as claimed in claim 1 wherein said ester is 3,5,5-trimethyl-1-hexyl benzoate.

4. A composition as claimed in claim 1 wherein said ester is 3,5,5-trimethyl-1-hexyl chlorobenzoate.

5. A composition as claimed in claim 1 wherein said ester is 3,5,5-trimethyl-1-hexyl formate.

6. A composition as claimed in claim 1 wherein said polymer is an interpolymer of vinyl chloride and methyl methacrylate.

7. A composition as claimed in claim 1 wherein said polymer is an interpolymer of vinyl acetate and vinyl chloride.

HUGH G. REID.

REFERENCES CITED

The following references are of record in the file of this patent:

UNITED STATES PATENTS

| Number | Name | Date |
|---|---|---|
| 2,015,077 | Lawson | Sept. 24, 1935 |
| 2,157,697 | Hagedorn | May 9, 1939 |